(12) United States Patent
Fujita et al.

(10) Patent No.: US 10,489,451 B2
(45) Date of Patent: Nov. 26, 2019

(54) VOICE SEARCH SYSTEM, VOICE SEARCH METHOD, AND COMPUTER-READABLE STORAGE MEDIUM

(71) Applicant: Hitachi, Ltd., Chiyoda-ku, Tokyo (JP)

(72) Inventors: Yusuke Fujita, Tokyo (JP); Ryu Takeda, Tokyo (JP); Naoyuki Kanda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 372 days.

(21) Appl. No.: 14/907,877

(22) PCT Filed: Sep. 11, 2013

(86) PCT No.: PCT/JP2013/074495
§ 371 (c)(1),
(2) Date: Jan. 27, 2016

(87) PCT Pub. No.: WO2015/037073
PCT Pub. Date: Mar. 19, 2015

(65) Prior Publication Data
US 2016/0171100 A1    Jun. 16, 2016

(51) Int. Cl.
*G06F 16/638* (2019.01)
*G06F 16/64* (2019.01)
(Continued)

(52) U.S. Cl.
CPC .......... *G06F 16/638* (2019.01); *G06F 16/00* (2019.01); *G06F 16/24578* (2019.01);
(Continued)

(58) Field of Classification Search
CPC ..... H04M 2201/40; H04M 3/51; G10L 13/00; G10L 15/26; G10L 15/22;
(Continued)

(56) References Cited

U.S. PATENT DOCUMENTS 8,964,946 B1 *  2/2015  Scheet .................... G10L 15/26
                                                    379/88.01
9,596,349 B1 *  3/2017  Hernandez .......... H04M 3/5175
(Continued)

FOREIGN PATENT DOCUMENTS

JP    2006-276754 A    10/2006
JP    2007-184699 A     7/2007
(Continued)

OTHER PUBLICATIONS

International Search Report (PCT/ISA/210) issued in PCT Application No. PCT/JP2013/074495 dated Nov. 26, 2013 with English translation (Four (4) pages).
(Continued)

*Primary Examiner* — Robert W Beausoliel, Jr.
*Assistant Examiner* — Pedro J Santos
(74) *Attorney, Agent, or Firm* — Crowell & Moring LLP (57) ABSTRACT

Provided is a voice search technology that can efficiently find and check a problematic call. To this end, a voice search system of the present invention includes a call search database that stores, for each of a reception channel and a transmission channel of each of a plurality of pieces of recorded call voice data, voice section sequences in association with predetermined keywords and time information. The call search database is searched based on an input search keyword, so that a voice section sequence that contains the search keyword is obtained. More specifically, the voice search system obtains, as a keyword search result, a voice section sequence that contains the search keyword and the appearance time thereof from the plurality of pieces of recorded call voice data, and obtains, based on the appearance time in the keyword search result, the start time of a voice section sequence of another channel immediately before the voice section sequence obtained as the keyword
(Continued)

search result, and thus determines the start time as the playback start position for playing back the recorded voice. Then, the playback start position is output as a voice search result.

9 Claims, 8 Drawing Sheets (51) Int. Cl.

| | | |
|---|---|---|
| *G10L 15/00* | (2013.01) | |
| *G10L 15/10* | (2006.01) | |
| *H04M 3/51* | (2006.01) | |
| *H04M 11/10* | (2006.01) | |
| *G10L 15/26* | (2006.01) | |
| *G10L 15/08* | (2006.01) | |
| *G06F 16/00* | (2019.01) | |
| *G10L 25/63* | (2013.01) | |
| *G06F 16/2457* | (2019.01) | |
| *H04M 3/42* | (2006.01) | |

(52) U.S. Cl.
CPC .............. *G06F 16/64* (2019.01); *G10L 15/00* (2013.01); *G10L 15/08* (2013.01); *G10L 15/10* (2013.01); *G10L 15/26* (2013.01); *H04M 3/42221* (2013.01); *H04M 3/51* (2013.01); *H04M 11/10* (2013.01); *G10L 25/63* (2013.01); *G10L 2015/088* (2013.01); *H04M 2201/40* (2013.01); *H04M 2203/301* (2013.01)

(58) Field of Classification Search
CPC ......... G06F 17/30017; G06F 17/30769; G06F 17/30743; G06F 17/30749; G06F 17/30772; G06F 16/638; G06F 16/64; G06F 16/24578; G06F 16/00
USPC .......................... 707/722, E17.009, 749, 769
See application file for complete search history.

(56) References Cited

U.S. PATENT DOCUMENTS

| | | | |
|---|---|---|---|
| 2003/0033145 A1* | 2/2003 | Petrushin ................ G10L 17/26 | |
| | | | 704/236 |
| 2007/0154006 A1 | 7/2007 | Onodera et al. | |
| 2010/0057458 A1 | 3/2010 | Iwaki et al. | |
| 2016/0284345 A1* | 9/2016 | Ji ............................ G10L 15/08 | |

FOREIGN PATENT DOCUMENTS

| | | |
|---|---|---|
| JP | 2009-170953 A | 7/2009 |
| JP | 2010-41286 A | 2/2010 |
| JP | 2010-55259 A | 3/2010 |
| JP | 2011-82839 A | 4/2011 |
| JP | 2011-102862 A | 5/2011 |

OTHER PUBLICATIONS

Japanese-language Written Opinion (PCT/ISA/237) issued in PCT Application No. PCT/JP2013/074495 dated Nov. 26, 2013 (Four (4) pages).

\* cited by examiner

| 301 | 302 | 303 | 304 | 305 | 306 |
|---|---|---|---|---|---|
| Record ID | Operator ID | Telephone Number | Recorded Time | Transmitted Voice | Received Voice |
| 1234 | AAA | 0123456789 | 2013/3/21 12:34:56 | aaa_send.wav | aaa_recv.wav |

Phoneme Sequence Table 501

| Record ID | Type | Phoneme Sequence | Phoneme Time Sequence |
|---|---|---|---|
| 1234 | Transmission | M O O SHI W A K E ... | 2.11 2.13 2.15 2.47 2.53 2.68 2.90 3.00 3.10 ... |
| 1234 | Reception | K O M A R U N N D E ... | 0.05 0.06 0.07 0.09 0.11 0.13 0.14 0.17 0.19 ... |
| 5678 | Transmission | M O O SHI W A K E ... | 12.3 12.4 12.6 12.8 12.9 13.0 13.1 13.2 13.3 ... |
| 5678 | Reception | O N E G A I SHI M A S ... | 8.88 8.92 9.01 9.12 9.34 9.39 9.42 9.51 9.63 9.79 9.83 ... |

Voice Section Sequence Table 502

| Record ID | Type | Voice Start Time Sequence | Voice End Time Sequence |
|---|---|---|---|
| 1234 | Transmission | 2.11 9.10 16.1 | 4.50 14.9 20.0 |
| 1234 | Reception | 0.05 5.10 15.3 20.1 | 1.90 8.50 15.9 30.5 |
| 5678 | Transmission | 12.3 19.10 26.1 | 13.4 24.9 30.0 |
| 5678 | Reception | 8.88 15.10 25.3 | 12.0 18.5 25.9 |

Emotion Score Sequence Table 503

| Record ID | Type | Emotion Score Sequence | Voice Start Time Sequence |
|---|---|---|---|
| 1234 | Transmission | 0.13 0.22 0.02 | 2.11 9.10 16.1 |
| 1234 | Reception | 0.98 0.99 0.44 0.56 | 0.05 5.10 15.3 20.1 |
| 5678 | Transmission | 0.11 0.21 0.11 | 12.3 19.10 26.1 |
| 5678 | Reception | 0.22 0.33 0.44 | 8.88 15.10 25.3 |

Keyword Search Results 801

| Rank | Score | Record ID | Type | Start Time | End Time |
|---|---|---|---|---|---|
| 1 | 0.9 | 5678 | Transmission | 12.3 | 13.4 |
| 2 | 0.8 | 1234 | Transmission | 2.11 | 4.50 |

Playback Start Position Determination Results 802

| Rank | Record ID | Type | Start Time | End Time |
|---|---|---|---|---|
| 1 | 5678 | Reception | 8.88 | 12.0 |
| 2 | 1234 | Reception | 0.05 | 1.90 |

Priority Determination Results 803

| Rank | Record ID | Type | Score | Start Time | End Time |
|---|---|---|---|---|---|
| 1 | 1234 | Reception | 0.98 | 0.05 | 1.90 |
| 2 | 5678 | Reception | 0.22 | 8.88 | 12.0 |

Fig. 9

Search Result Display Screen 901

| Operator | Telephone Number | Recorded Date and Time | | |
|---|---|---|---|---|
| | Mooshiwake gozaimasen | | Search | |
| suzuki | 0901234 | March 15, 2013 10:00:00 | Mooshiwake gozaimasen | ← Keyword Button 902 for Selecting Playback Start Position |
| sato | 0901234 | March 15, 2013 13:00:00 | Mooshiwake gozaimasen | ← Keyword Button 902 for Selecting Playback Start Position |
| tanaka | 0901234 | March 15, 2013 12:00:00 | Mooshiwake gozaimasen | ← Keyword Button 902 for Selecting Playback Start Position |

VOICE SEARCH SYSTEM, VOICE SEARCH METHOD, AND COMPUTER-READABLE STORAGE MEDIUM

TECHNICAL FIELD

The present invention relates to a voice search system, a voice search method, and a computer-readable storage medium, and for example, relates to a technology for searching for the content of voice data stored in a storage device and displaying the search results.

BACKGROUND ART

In recent years, in companies that manage a call center and hold a large volume of voice data, it has been demanded to automate the operation of extracting information from voice data. In particular, a supervisor who manages operators in a call center aims at efficiently finding and checking problematic calls (i.e., complaints) from among a large volume of call voice data, and utilizing the results to educate the operators and promptly deal with the complaints.

As a method for efficiently finding and checking problematic calls, there are known a method for identifying a complaint from a recorded call and a method for identifying a necessary part from which particular information is to be got from a recorded call.

As a method for identifying a complaint from a recorded call, there is known a method of, as shown in Patent Literature 1, for example, converting an emotional expression of a speaker into a feature quantity based on the voice intonation, a change in the voice intensity, and pauses in the recorded voice data, which has been obtained by recording a telephone conversation between a user and an operator, and scoring the voice data using a keyword contained in the voice data as well as the feature quantity that is based on the emotional expression, and then determining which call should be dealt with as a complaint based on the score value.

Meanwhile, as a method for identifying a necessary part from which particular information is to be got from a recorded call, there is known a method of, as shown in Patent Literature 2, for example, identifying a part of the conversation at a point where the speaker changed from an operator to a customer as the necessary part from which particular information is to be got, using a speech time as a parameter, and determining the part as the playback start point (i.e., part-to-elicit).

CITATION LIST

Patent Literature

Patent Literature 1: JP 2011-82839A
Patent Literature 2: JP 2007-184699 A

SUMMARY OF INVENTION

Technical Problem

However, when the method of Patent Literature 1 is used alone, it would be impossible to check at which part and why a customer was angry unless the whole recorded call that contains the identified complaint is listened to. Meanwhile, even when the method of Patent Literature 1 is combined with the method of Patent Literature 2, it would be impossible to, if a recorded call contains a number of parts-to-elicit, check at which part and why a customer was angry unless the entire parts-to-elicit are listened to. That is, with the conventional methods, it has been impossible to find a problematic call and efficiently check the content of the problem by listening to only a part of the recorded call.

The present invention has been made in view of the foregoing circumstances. The present invention provides a voice search technology that can efficiently find and check problematic calls.

Solution to Problem

In order to solve the above problems, a voice search system in accordance with the present invention includes a call search database that stores, for each of a reception channel and a transmission channel of each of a plurality of pieces of recorded call voice data, voice section sequences in association with predetermined keywords and time information. The call search database is searched based on an input search keyword, so that a voice section sequence that contains the search keyword is obtained. More specifically, the voice search system obtains, as a keyword search result, a voice section sequence that contains the search keyword and the appearance time thereof from the plurality of pieces of recorded call voice data, and obtains, based on the appearance time in the keyword search result, the start time of a voice section sequence of another channel immediately before the voice section sequence obtained as the keyword search result, and thus determines the start time as a playback start position for playing back the recorded voice. Then, the playback start position is output as a voice search result.

Further features related to the present invention will become apparent from the description of this specification and the accompanying drawings. In addition, embodiments of the present invention can be implemented by elements, a combination of a variety of elements, and the features of the following detailed description and the appended claims.

It should be appreciated that the description of this specification contains merely typical examples and thus that the claims of the present invention or examples of the application of the present invention should not be limited in any sense.

Advantageous Effects of Invention

According to the present invention, it is possible to efficiently check and find a problematic speech from a recorded call.

DESCRIPTION OF EMBODIMENTS

Hereinafter, embodiments of the present invention will be described with reference to the accompanying drawings. In the drawings, elements with the same function may be represented by the same reference numerals. Although the drawings illustrate specific embodiments and implementation examples in accordance with the principle of the present invention, they are used only for the understanding of the present invention, and should not be used to construe the present invention in a limited way.

Although the present embodiment will be described in full details for those skilled in the art to carry out the present invention, it should be appreciated that other implementations and embodiments are also possible, and changes in the configuration and structure as well as replacement of a variety of elements is also possible in so far as they are within the spirit and scope of the present invention. Thus, the following description should not be construed in a limited way.

Further, as described below, the embodiment of the present invention may be implemented by any of software that runs on a general purpose computer, dedicated hardware, or a combination of both.

Although the following description illustrates each information of the present invention in a "table" form, such information need not necessarily be represented by a data structure in a table form, and may be represented by other data structures, such as a list, DB, or queue. Therefore, in order to show that each information of the present invention does not depend on the data structure, a "table," "list," "DB," "queue," and the like may be simply referred to as "information."

In addition, in describing the content of each information, an expression such as "identification information," "identifier," "name," or "ID" can be used, which are all interchangeable.

In the following description, each process in the embodiment of the present invention is performed by each processing unit, such as a playback start position determination unit, as a subject (i.e., a subject that performs the operation). However, as a process of each processing unit is programmed and the program is implemented by being executed by a processor, the following description may also be made such that each process is performed by a processor as a subject. Further, some or all of programs may be implemented by dedicated hardware, or may be implemented as a module(s). A variety of programs may also be installed on a computer by a program distribution server or a storage medium.

<Hardware Configuration of a Voice Search System>

Figure 1:
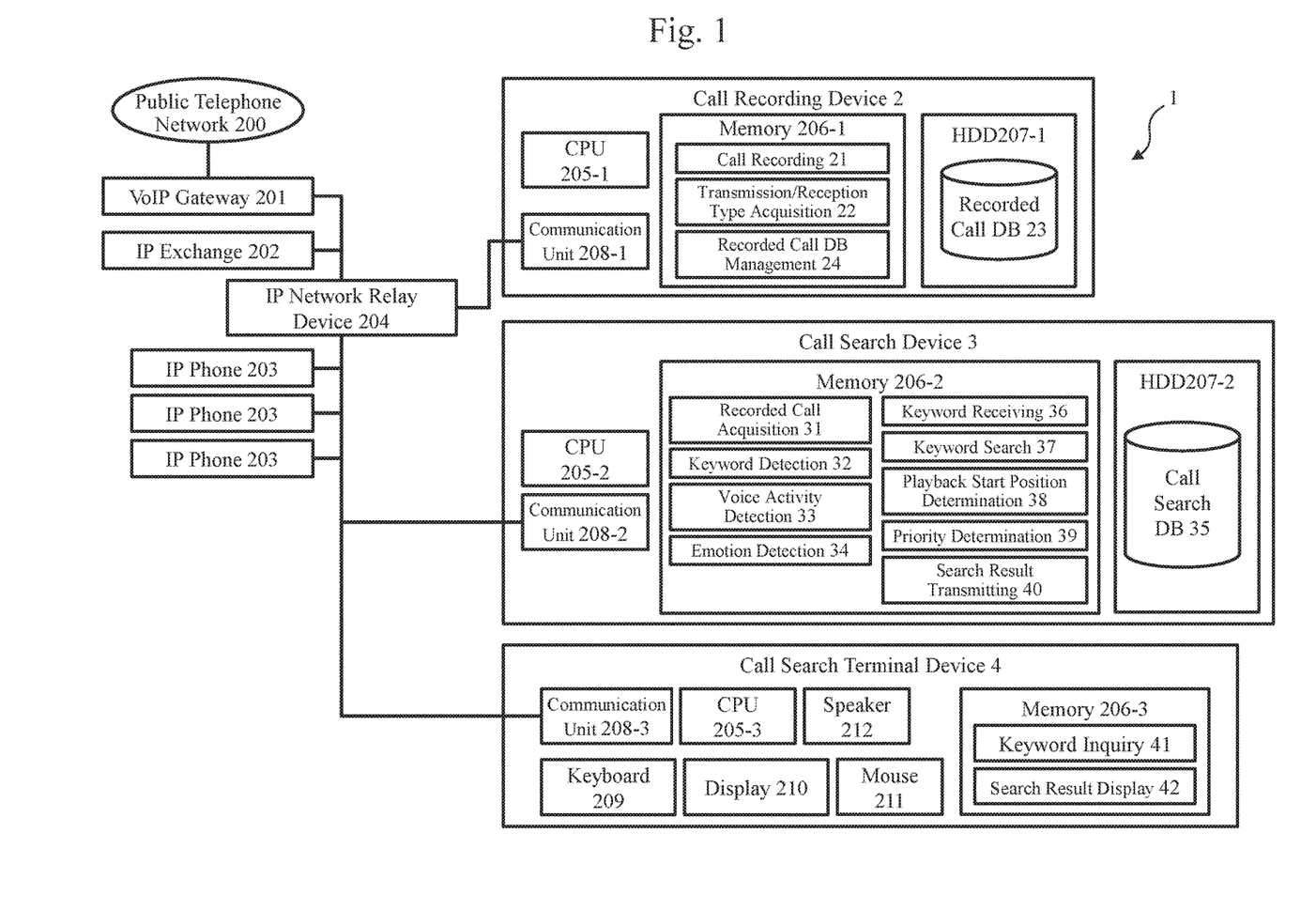
FIG. 1 is a diagram showing an exemplary hardware configuration of a voice search system in accordance with an embodiment of the present invention.

FIG. 1 is a diagram showing an exemplary hardware configuration of a voice search system in accordance with an embodiment of the present invention.

A voice search system 1 includes a VoIP gateway 201, an IP exchange 202, a plurality of IP phones 203, an IP network relay device 204, a call recording device 2, a call search device 3, and a call search terminal device 4. The plurality of IP phones 203 are provided in a call center so that a plurality of operators can answer calls from customers who are using phones on a public telephone network 200. Each of the call recording device 2, the call search device 3, and the call search terminal device 4 may be implemented by an ordinary computer.

The call recording device 2 includes a CPU 205-1, a memory 206-1, a HDD 207-1, and a communication unit 208-1 that is connected to the IP network relay device 204. The memory 206-1 stores programs for performing processes of a call recording unit 21, a transmission/reception type acquisition unit 22, and a recorded call DB management unit 24. The HDD 207-1 includes a recorded call DB 23.

The call search device 3 includes a CPU 205-2, a memory 206-2, a HDD 207-2, and a communication unit 208-2 that is connected to the IP network relay device 204. The memory 206-2 stores programs for performing processes of a recorded call acquisition unit 31, a keyword detection unit 32, a voice activity detection unit 33, an emotion detection unit 34, a keyword receiving unit 36, a keyword search unit 37, a playback start position determination unit 38, a priority determination unit 39, and a search result transmitting unit 40. The HDD 207-2 includes a call search DB 35.

The call search terminal device 4 includes a CPU 205-3, a memory 206-3, a HDD 207-3, a communication unit 208-3 that is connected to the IP network relay device 204, a keyboard 209, a display 210, a mouse 211, and a speaker 212. The memory 206-3 stores programs for implementing processes of a keyword inquiry unit 41 and a search result display unit 42.

<Operation of the Voice Search System (Summary of Process)>

Figure 2:
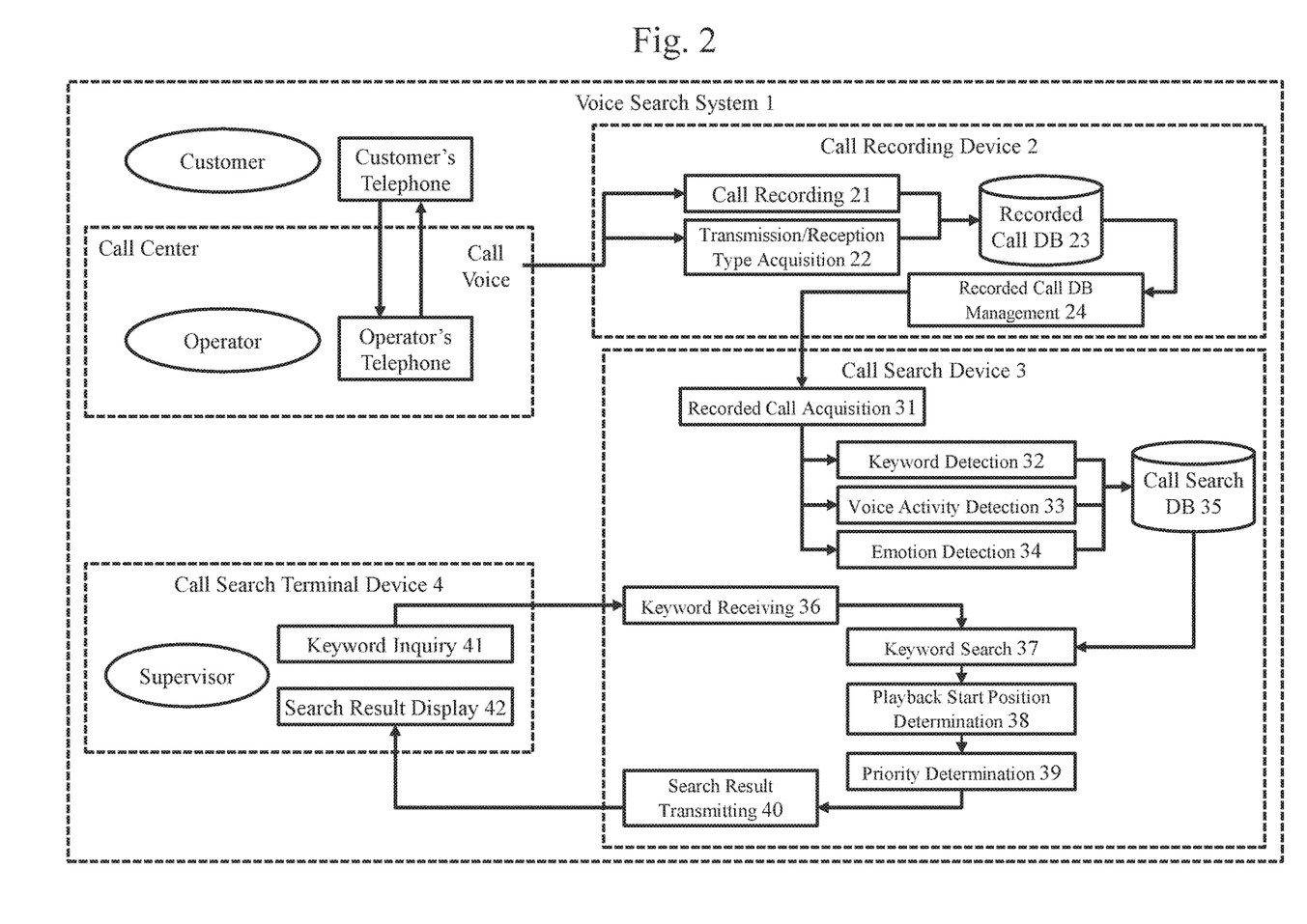
FIG. 2 is a functional block diagram for illustrating a summary of a process performed in a voice search system in accordance with an embodiment of the present invention.

FIG. 2 is a functional block diagram for illustrating a summary of a process performed in the voice search system 1.

The voice search system 1 is configured such that a telephone conversation in a call between a customer and an operator in a call center is recorded by the call recording device 2 so as to allow a supervisor to use the recorded call to search for a problematic speech with the use of the call search device 3 and the call search terminal device 4 with which a keyword search of the recorded call is possible.

In the call recording device 2, the call recording unit 21 records a telephone conversation in a call between a customer and an operator. In addition, the transmission/reception type acquisition unit 22 determines whether the recorded call contains a speech of the operator (transmission) or a speech of the customer (reception). The thus obtained recorded call data is stored in the recorded call DB 23 in association with the determined type (transmission/reception), and thus is managed. The recorded call DB management unit 24 receives a request (i.e., a request to transmit call data at a particular time) from the outside (e.g., the recorded call acquisition unit 31), and transmits information in the recorded call DB 23 to the source of request.

In the call search device 3, the recorded call acquisition unit 31 transmits a request to the recorded call DB management unit 24 to transmit call data, and obtains a recorded call that has been stored in the recorded call DB 23 in the call recording device 2. The keyword detection unit 32 detects a keyword contained in the obtained recorded call. The keyword to be detected is determined in advance or is input from the outside. The voice activity detection unit 33 detects a voice section in the obtained recorded call. Further, the emotion detection unit 34 detects an emotion in the obtained recorded call. Once a keyword, a voice section, and an emotion are detected from the obtained recorded call, such detection results are stored in the call search DB 35 in association with the appearance time thereof in the voice, and are managed. Meanwhile, the keyword receiving unit 36 receives a keyword from the outside (i.e., the call search terminal device 4 operated by a supervisor). The keyword search unit 37, based on the received keyword, searches the call search DB 35 for the appearance time of the keyword. The playback start position determination unit 38 searches keyword search results 801 for the appearance time of a voice section of a different type (i.e., a transmission channel or a reception channel) immediately before the speech containing the keyword, in addition, the priority determination unit 39 determines the priorities of the keyword search results (e.g., see reference numeral 801 in FIG. 8) based on the results of searching playback start position determination results 802 for an emotion. Finally, the search result transmitting unit 40 transmits the priority-based search results to the call search terminal device 4.

In the call search terminal device 4, the keyword inquiry unit 41, in response to an instruction from a supervisor, inquires of the call search device 3 about an input keyword. In addition, the search result display unit 42 receives search results from the call search device 3, and displays the results on the display 210.

<Recorded Call DB>

Figure 3:
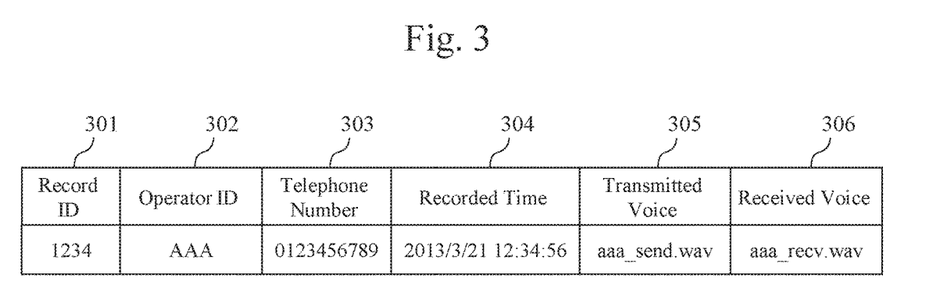
FIG. 3 is a diagram showing an exemplary configuration of a recorded call DB in accordance with an embodiment of the present invention.

FIG. 3 is a diagram showing an exemplary configuration of the recorded call DB 23, The recorded call DB 23 can be constructed using a known relational database.

The recorded call DB 23 contains, as the constituent items, a record ID 301 for uniquely distinguishing and identifying a recorded call, an operator ID 302 for uniquely distinguishing and identifying an operator who answered a customer in the recorded call, a telephone number 303 that indicates a telephone number of the customer in the recorded call, a recorded time 304 that indicates the time when the call was recorded, a transmitted voice 305 that is the voice data of the operator in the recorded call, and a received voice 306 that is the voice data of the customer in the recorded call. It should be noted that each of the transmitted voice 305 and the received voice 306 stores a file path that indicates the actual storage position of the voice file.

<Operation of the Voice Search System 1>

The voice search system 1 executes a process of creating a call search DB and a process of searching a call search DB. Hereinafter, such processes will be described in detail.

(i) Process of Creating a Call Search DB

Figure 4:
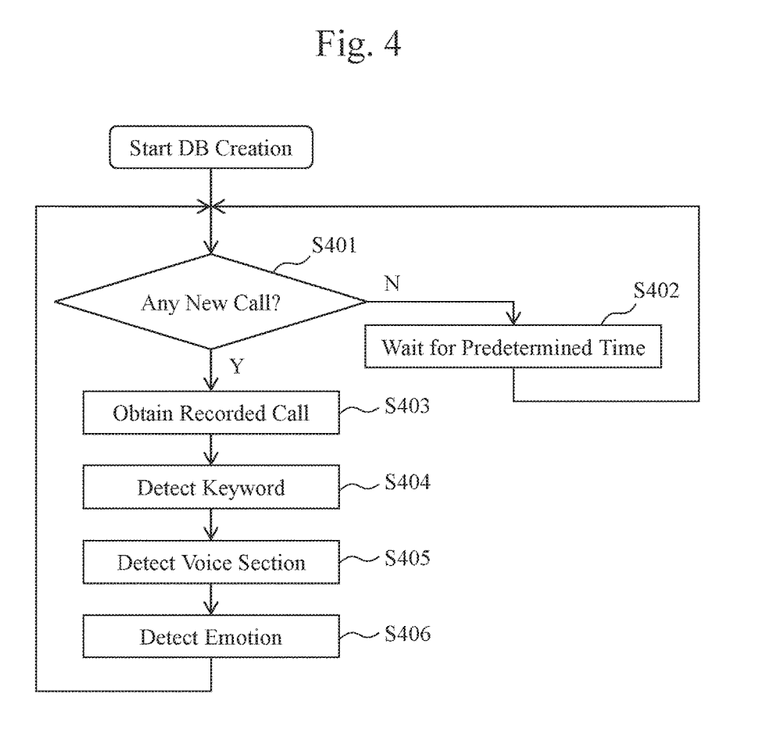
FIG. 4 is a flowchart for illustrating the details of a process of creating a call search DB that is executed by a voice search system in accordance with an embodiment of the present invention.

FIG. 4 is a flowchart for illustrating the details of a process of creating a call search DB that is executed by the voice search system 1.

First, the recorded call acquisition unit 31 inquires of the recorded call DB management unit 24 in the call recording device 2 about whether there is a newly recorded call or not (step S401). At this time, the recorded call DB management unit 24 receives the inquiry about whether there is a newly recorded call or not, and if there is a recorded call that has been recorded at a time later than a predetermined time, returns the record ID of the call to the recorded call acquisition unit 31. If there is no recorded call, the recorded call acquisition unit 31 waits for a predetermined time (step S 402).

If there is a recorded call, the recorded call acquisition unit 31 obtains from the call recording device 2 a transmitted voice and a received voice in the recorded call corresponding to the new record ID (step S403).

Next, the keyword detection unit 32 detects a predetermined keyword in the voice (step S404). As a process of detecting a keyword in the voice, some methods are known. For example, there is known a method of converting a voice into a sentence using a large vocabulary continuous speech recognition technology, and creating a database of a pair of each word (i.e., morpheme) that constitutes the sentence and the appearance time thereof. With this method, it is possible to retrieve a phrase that is formed by known words at fast speed, but it is impossible to retrieve a phrase that contains unknown words because unknown words would be erroneously recognized as different words. As another method, there is also known a method of converting a voice into a phoneme sequence using a sub-word recognition technology, and creating a database of a pair of each phoneme and the appearance time thereof. With this method, it is possible to, by converting a keyword into a phoneme sequence in conducting a search, retrieve even unknown words, but it is necessary to conduct a search so as to tolerate errors in phoneme recognition. Thus, the search takes some time. As a still another method, there is also known a method of creating a database of voice feature quantities. When a search is conducted with this method, it is possible to retrieve even unknown words with high precision by checking a voice feature quantity sequence against a voice model corresponding to a keyword and detecting the appearance position of the keyword. However, as it is necessary to check a voice feature quantity per short-frame-basis, the search takes a long time. Hereinafter, a configuration in which the sub-word recognition technology is used will be exemplarily described based on the assumption that an unknown word is retrieved at fast speed. The keyword detection unit 32 recognizes phonemes of each of a transmitted voice and a received voice, and stores the phonemes in a phoneme sequence table 501 (see FIG. 5) in the call search DB 35 together with the appearance times of the phonemes.

Then, the voice activity detection unit 33 detects a voice section in the telephone conversation (step S405). A process of detecting a voice section can be implemented using a known technique. For example, a method that is based on the threshold of the voice power or a method that is based on pattern recognition of voice feature quantities can be used. A telephone conversation includes a voice of a human, a silent section, a holding tone, and the like. Herein, only a voice portion of a human is extracted through voice activity detection. The voice activity detection unit 33 forms, from the start time and the end time of each of voice sections detected from the transmitted voice and the received voice, a voice start time sequence and a voice end time sequence, and adds them to a voice section sequence table 502 (see FIG. 5).

Next, the emotion detection unit 34 detects an emotion in the telephone conversation (step S406). A process of detecting an emotion in a voice can be implemented using a known technology. For example, there is known a method of distinguishing between an emotion of anger and an emotion of calmness based on the voice feature quantity, voice pitch, the average value of the speech rate, and a variation thereof that have been extracted from a voice. When a discriminator for discriminating between anger and calmness is learned in advance from a database of an angry voice and a calm voice, using a technology of a support vector machine and the like, it becomes possible to calculate a score of an emotion of anger based on the distance from the discrimination boundary. Herein, an emotion of anger or calmness (i.e., non-verbal information: non-verbal information that can be used herein is not limited to an emotion but may be a score that is calculated from a different perspective, such as the fluidity of a voice or the clarity of a voice, or may also be non-verbal information such as the voice pitch, voice volume, the speech rate, or the length of a silent section in the surrounding) is discriminated for each voice section, and the distance from the discrimination boundary is determined as an emotion score (i.e., a non-verbal information score). The emotion detection unit 34 forms an emotion score sequence and a start time sequence of the corresponding voice section from each of the transmitted voice and the received voice, and adds them to an emotion score sequence table 503 (see FIG. 5).

Through the aforementioned process of creating a call search DB, it becomes possible to search for a recorded call based on a keyword and search for the correspondence between a voice section and an emotion score from the time.

(ii) Exemplary Configuration of the Call Search DB

Figure 5:
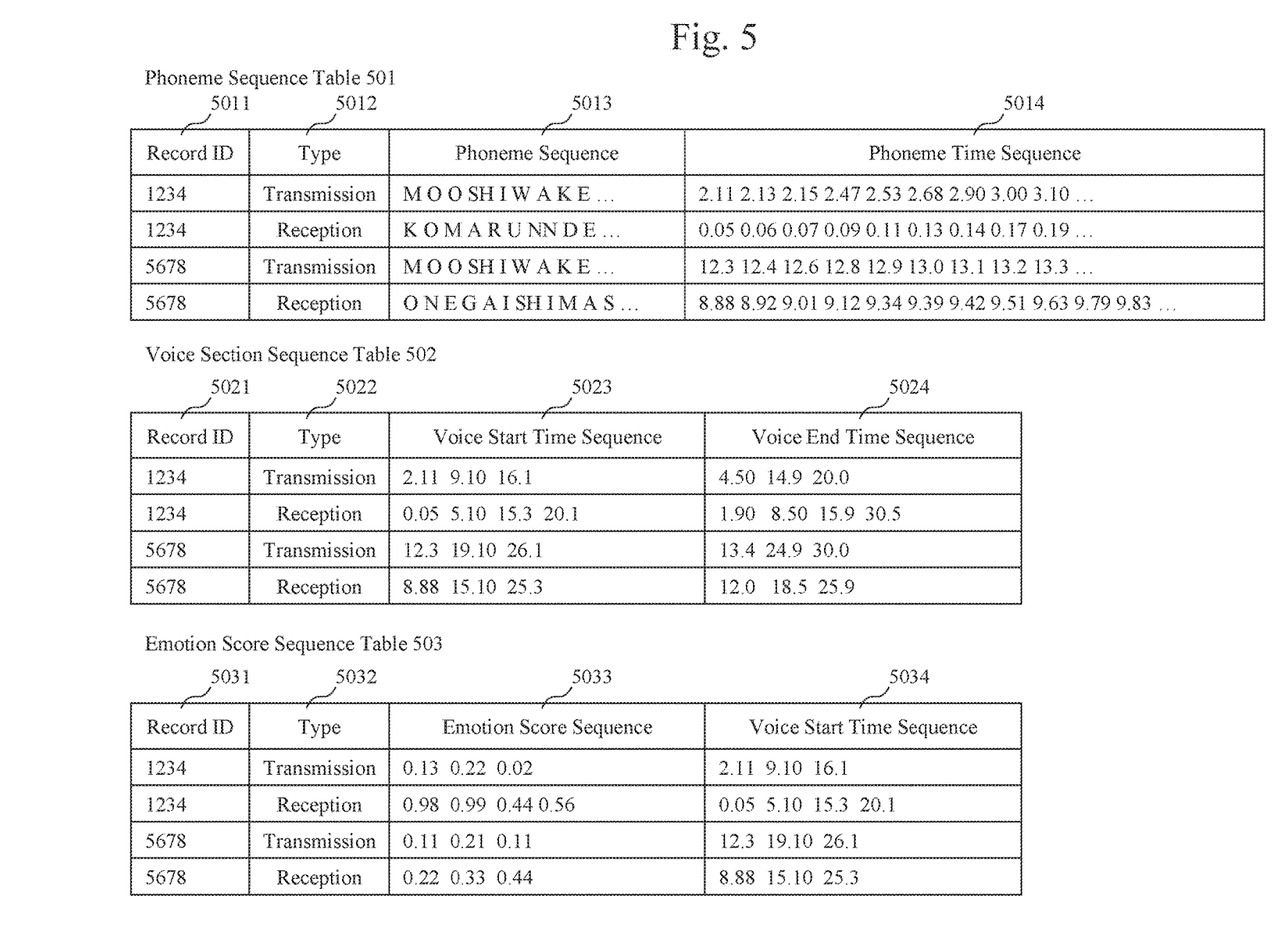
FIG. 5 is a chart showing an exemplary configuration of a call search DB in accordance with an embodiment of the present invention.

FIG. 5 is a chart showing an exemplary configuration of the call search DB 35. The call search DB 35 can be constructed using a known relational database.

The call search DB 35 includes a phoneme sequence table 501, a voice section sequence table 502, and an emotion score sequence table 503.

The phoneme sequence table 501 contains, as the constituent items, a record ID 5011 for uniquely discriminating and identifying a recorded call, a type 5012 that indicates the type of a channel (i.e., a transmission channel or a reception channel) to which the corresponding phoneme sequence belongs, a phoneme sequence 5013 that holds at least one phoneme sequence to be managed, and a phoneme time sequence 5014 that indicates the relative time (which is represented as the absolute time in the phoneme time sequence) at which each phoneme appears with respect to the call start time. In each type 5012, if a plurality of phoneme sequences is held as the phoneme sequence 5013, the plurality of phoneme sequences are managed in parallel. For example, each phoneme sequence is managed such that ("M O O SH I W A K E G O Z A I M A S E NN (which means "I'm sorry")," "K A SH I K O M A R I M A SH I T A (which means "Certainly.") . . . ). In a phoneme sequence, each constituent phoneme is delimited with a space. In the phoneme time sequence 5014, each phoneme is represented by the absolute time in the voice file. Thus, it is found, for example, that the first phoneme "M" of "M O O S H I W A K E G O Z A I M A S E NN (which means "I'm sorry")" is uttered for 0.02 seconds (=time 2.13–time 2.11). In the phoneme time sequence 5014, the time at which each phoneme appears is also managed by being delimited with a space.

The voice section sequence table 502 contains, as the constituent items, a record ID 5021 for uniquely discriminating and identifying a recorded call, a type 5022 that indicates the type of a channel (i.e., a transmission channel or a reception channel) to which the corresponding phoneme sequence belongs, a voice start time sequence 5023 for holding the start time of a voice section sequence that contains each phoneme sequence managed by the phoneme sequence table, and a voice end time sequence 5024 for holding the end time of a voice section sequence that contains each phoneme sequence managed by the phoneme sequence table 501. From the table, it is found that a voice section that contains a phoneme sequence: "M O O SH I W A K E G O Z A I M A S E NN (which means "I'm sorry")" on the transmitter side (i.e., operator) with the record (call) ID=1234 starts at a time 2.11, and ends at a time 4.50, and it is also found that a voice section that contains a phoneme sequence: "K O M A R U NN D E S U Y O N E (which means "I have a problem with . . . ")" on the receiver side (i.e., customer) with the same record ID starts at a time 0.05, and ends at a time 1.90. When the voice section sequence table 502 is used, it is possible to identify the order in which each phoneme sequence that constitutes a recorded call appears.

The emotion score sequence table 503 contains, as the constituent items, a record ID 5031 for uniquely discriminating and identifying a recorded call, a type 5032 that indicates the type of a channel (i.e., a transmission channel or a reception channel) to which the corresponding phoneme sequence belongs, an emotion score sequence 5033 for holding an emotion score value calculated for each phoneme sequence, and a voice start time sequence 5034 for holding the start time of each phoneme sequence that is managed by the phoneme sequence table 501.

(iii) Process of Searching the Call DB

Figure 6:
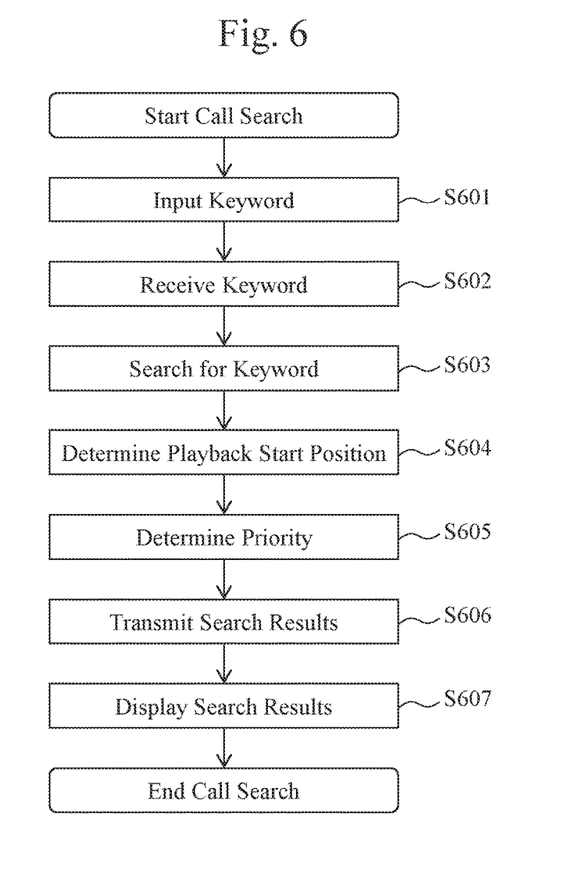
FIG. 6 is a flowchart for illustrating the details of a call search process that is executed by a voice search system in accordance with an embodiment of the present invention.

FIG. 6 is a flowchart for illustrating the details of a call search process that is executed by the voice search system 1.

Figure 7:
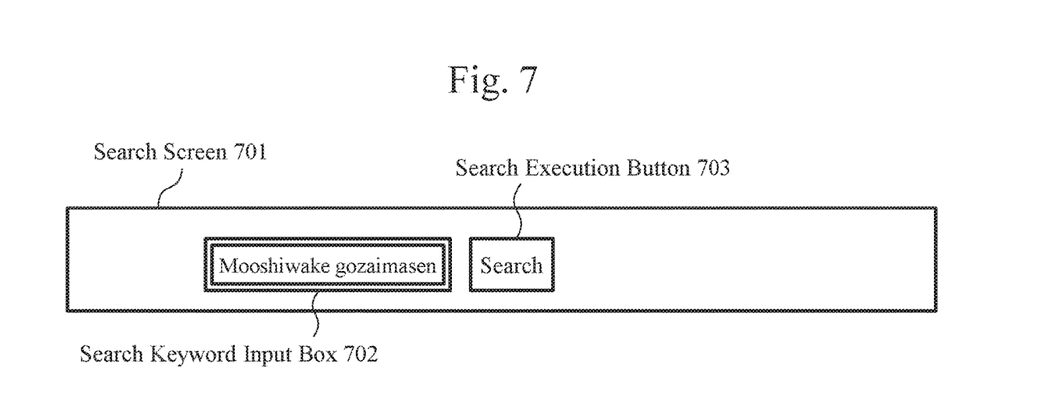
FIG. 7 is a diagram showing an exemplary configuration of a search screen in accordance with an embodiment of the present invention.

First, the keyword inquiry unit 41 obtains a keyword input by a user (step S601). Herein, the keyword inquiry unit 41 may display a search screen 701 such as the one shown in FIG. 7 on the display 210 to prompt a user (i.e., supervisor) to input a keyword. As shown in FIG. 7, a user selects a search keyword input box 702, which is displayed on the display 210, with the mouse 211, and inputs a search keyword with the keyboard 209. Finally, the user transmits the keyword to the call search device 3 by clicking a search execution button 703 with the mouse 211.

Next, the keyword receiving unit 36 receives the keyword (step S602).

Figure 8:
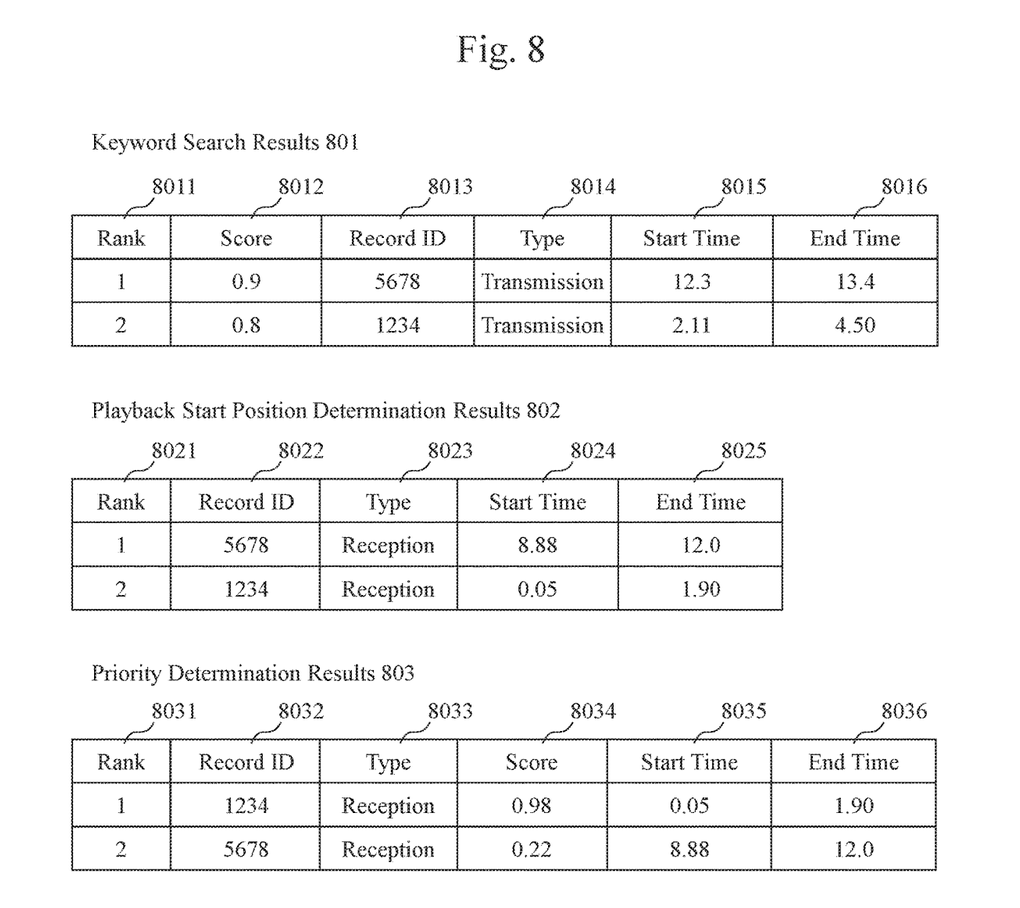
FIG. 8 is a chart showing examples of keyword search results in accordance with an embodiment of the present invention.

Then, the keyword search unit 37 searches the phoneme sequence table 501 in the call search DB 35 based on the received keyword (step S603). Herein, the received keyword is converted into a phoneme sequence using a known grapheme-to-phoneme conversion technology, for example. When "Mooshiwake arimasenn (which means "I'm sorry")" is received as a keyword, for example, it is converted into the following phoneme sequence: "M O O SH I W A K E A R I M A S E NN." Then, the keyword search unit 37 searches for a portion in which the phoneme sequence obtained through the conversion is contained as a partial sequence in any of the phoneme sequences in the phoneme sequence table 501. At this time, if a search is conducted such that only a portion whose edit distance is less than a predetermined value is retrieved, it becomes possible to conduct a search that can tolerate errors in phoneme recognition. The keyword search unit 37 also determines the times corresponding to the start point and the end point of the retrieved phoneme sequence from the phoneme time sequence. FIG. 8 shows an example of the keyword search results 801. The keyword search results 801 contain, as the constituent items, a rank 8011 that indicates the rank of a score obtained by a keyword search, a score 8012 that indicates each score value obtained by a keyword search, a record ID 8013 for uniquely discriminating and identifying a recorded call, a type 8014 that indicates the type of a channel (i.e., a transmission channel or a reception channel) to which the corresponding phoneme sequence belongs, the start time 8015 and the end time 8016 of the phoneme sequence including the keyword search results. It should be noted that the rank 8011 is determined by sorting the results obtained by a keyword search in descending order of score. Herein, the edit distance can be used as the score.

Next, the playback start position determination unit 38 determines the start time for playing back the recorded voice in response to the keyword search results 801 (step S604). That is, the playback start position determination unit 38, referring to the call search DB 35, selects, for each record in the keyword search results 801, a plurality of records with the same record ID and different types (i.e., a phoneme sequence of "reception" if the type of the keyword search results is "transmission," or conversely, a phoneme sequence of "transmission" if the type of the keyword search results is "reception") from the voice section sequence table 502 as candidate playback start positions. In addition, the playback start position determination unit 38, referring to the voice start time sequence of the selected record, identifies the voice start time immediately before the start time in the keyword search results 801, and determines the identified voice start time and the corresponding voice end time as the playback start position determination results 802. Accordingly, it becomes possible to select, as the playback start position, the start time of a speech of the other party immediately before the voice start time in the keyword search results 801. Thus, when a search is conducted using a phrase of apology like "Mooshiwake arimasenn (which means "I'm sorry")" as a keyword, it is possible to listen to a recorded call, starting back from a speech of the other party that contains the reason for the apology. Accordingly, the playback start position determination results 802 shown in FIG. 8 are obtained. The playback start position determination results 802 include a rank 8021 in which a rank corresponding to the rank 8011 of the keyword search results is entered, a record ID 8022 for uniquely discriminating and identifying a recorded call, a type 8023 that indicates the type of a channel (i.e., a transmission channel or a reception channel) to which a phoneme sequence at the corresponding playback start position belongs, and the start time 8024 and the end time 8025 of the phoneme sequence determined as the playback start position based on the keyword search results 801.

Next, the priority determination unit 39 searches for emotion scores corresponding to the playback start position determination results 802, and sorts the search results in accordance with the results (step S605). That is, the priority determination unit 39, referring to the call search DB 35, selects, for each record of the playback start position determination results 802, records with the same record ID 8022 and the same type 8023 from the emotion score sequence table 503. In addition, the priority determination unit 39 retrieves, from the voice start time sequence of the selected record, a portion with the same voice start time as that in the playback start position determination results 802, and obtains the corresponding emotional score from the emotional score sequence. Further, the priority determination unit 39 sorts the search results based on the emotion scores. Accordingly, it becomes possible to, when a search is conducted using a phrase of apology like "Mooshiwake arimasenn (which means "I'm sorry")" as a keyword, sort the search results in accordance with the degree of anger in a speech of the other party immediately before the start time of the speech containing the keyword, through it has been common so far to take only the certainty of a keyword into consideration when sorting search results based on the edit distance, and thus, becomes possible to sort the search results based on the seriousness of the problem (i.e., complaint). Accordingly, priority determination results 803 shown in FIG. 8 are obtained. The priority determination results 803 contain, as the constituent items, a rank 8031 in which a rank corresponding to the rank 8011 of the keyword search results is entered, a record ID 8032 for uniquely discriminating and identifying a recorded call, a type 8033 that indicates the type of a channel (i.e., a transmission channel or a reception channel) to which a phoneme sequence at the corresponding playback start position belongs, a score 8034 that indicates an emotion score value of the phoneme sequence determined as the playback start position, and the start time 8035 and the end time 8036 of the phoneme sequence determined as the playback start position based on the keyword search results 801.

The search result transmitting unit 40 transmits the priority determination results 803 to the call search terminal device 4 (step S606).

Finally, the search result display unit 42 displays the search results on the display 210 based on the received priority determination results 803 (step S607). An example of the search result display screen is described below with reference to FIG. 9.

<Exemplary Configuration of the Search Result Display Screen>

Figure 9:
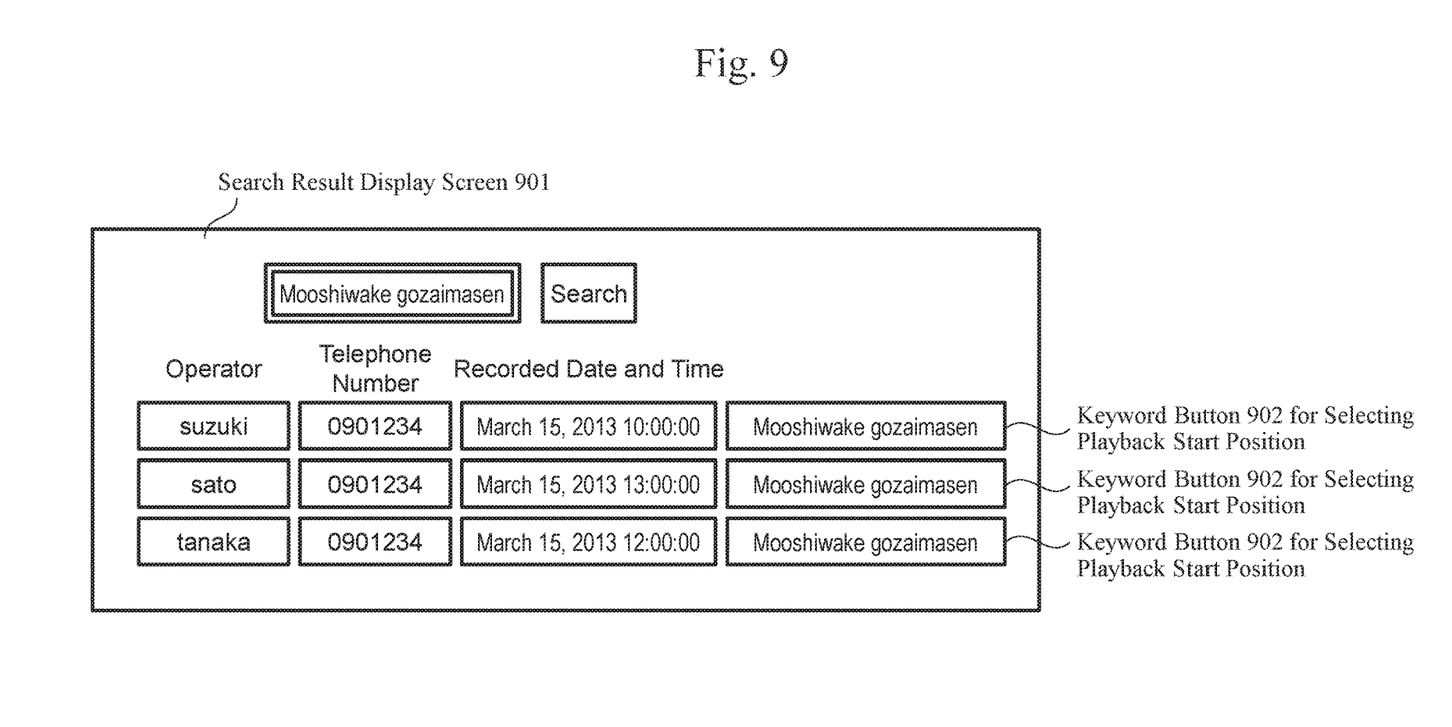
FIG. 9 is a diagram showing an exemplary basic configuration of a search result display screen in accordance with an embodiment of the present invention.

FIG. 9 is a diagram showing an exemplary basic configuration of a search result display screen 901.

The search result display unit 42 concurrently displays results, which have been obtained by searching for operators, telephone numbers, and the recorded date and time upon receiving an inquiry to the recorded call DB 23, on the search result display screen 901. As shown in FIG. 9, the search results are sequentially displayed based on the priority determination results 803.

For example, when a user (i.e., supervisor) clicks a keyword button 902 for selecting the playback start position, using the mouse 211, the recorded call acquisition unit 31 of the call search device 3 obtains a recorded call by inquiring of the recorded call DB 23, and plays back the recorded call from a portion corresponding to the start time based on the priority determination results 803. Accordingly, the user is able to, as a result of conducting a keyword search, listen to a recorded call, starting back from a portion of a problem (i.e., complaint) (herein, a speech of another channel (i.e., a speech of a customer) corresponding to a speech on a channel that contains the keyword (i.e., a speech of an operator)). In addition, as the priorities are determined and sorted in accordance with the seriousness of the problem (complaint), the problem can be efficiently grasped.

<Variations>

Although the aforementioned embodiment illustrates a case where the start time of a voice section sequence of the other party (e.g., a customer) immediately before a voice section sequence (e.g., a voice section of an operator), which has been identified by a keyword search, is selected as the playback start position, it is also possible to allow a user to select the playback start position from among a plurality of candidate playback start positions.

Hereinafter, an example (variation) in which the playback start position is determined using an emotion score will be described. The playback start position determination unit 38, referring to the call search DB 35, selects, for each record of the keyword search results 801, records with the same record ID and different types from the voice section sequence table 502.

In addition, the playback start position determination unit 38, referring to the voice start time sequence of the selected record, extracts a plurality of (e.g., three) voice start times before the start time in the keyword search results 801, and selects them as the candidate playback start positions.

Next, the playback start position determination unit 38 selects records with the same record ID and the same type from the emotion score sequence table 503.

Then, the playback start position determination unit 38 retrieves, from the voice start time sequences of the selected records, portions with the same voice start times as those of the candidate playback start positions, and retrieves the corresponding emotion scores from the emotion score sequences. Then, the playback start position determination unit 38 selects the maximum score out of the plurality of obtained emotion scores, and determines the corresponding voice start time as the playback start position determination results 802. Accordingly, it becomes possible to reach back to a portion in which an emotion of anger increased during the speech of the other party, which contains the reason for the apology, immediately before the start time in the keyword search results 801. It is also possible to, not only select the maximum emotion score, but also calculate an emotion score by taking into consideration the difference between the voice start time in the keyword search results 801 and each of the voice start times of the candidate playback start positions. Accordingly, it becomes possible to reach back to a speech in which an emotion of anger increased within the range as close as possible to the keyword.

Figure 10:
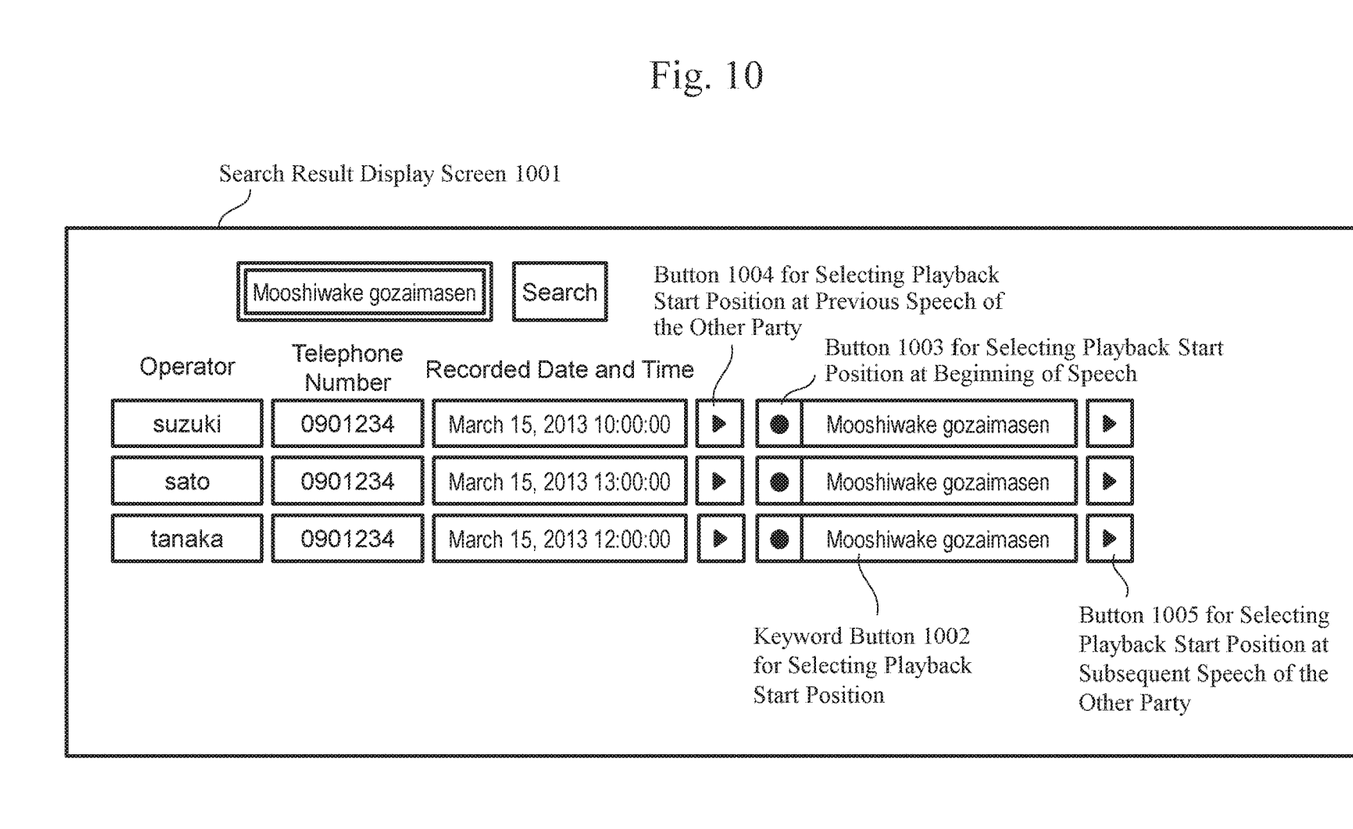
FIG. 10 is a diagram showing an exemplary modified configuration of a search result display screen in accordance with an embodiment of the present invention.

FIG. 10 shows an exemplary configuration of a search result display screen 1001 that allows a user to select the playback start position as described above.

The search result display screen 1001 includes, for each of at least one search result, a keyword button 1002 for selecting the playback start position, a button 1003 for selecting the playback start position at the beginning of the speech, a button 1004 for selecting the playback start position at the previous speech of the other party, and a button 1005 for selecting the playback start position at the subsequent speech of the other party, as the buttons for selecting the playback start position. The keyword button 1002 for selecting the playback start position is a button for selecting the start time of the first phoneme of a phoneme sequence, which has been identified by a keyword search, as the playback start position. The button 1003 for selecting the playback start position at the beginning of the speech is a button for selecting the start time of a voice section sequence, which has been identified by a keyword search, as the playback start position. The button 1004 for selecting the playback start position at the previous speech of the other party is, like the keyword button 902 for selecting the playback start position 902 in FIG. 9, a button for selecting the start time of a voice section sequence of the other party (e.g., the customer) immediately before the voice section sequence (e.g., the voice section of the operator), which has been identified by a keyword search, as the playback start position. The button 1005 for selecting the playback start position at the subsequent speech of the other party is a button for selecting the start time of a voice section sequence of the other party (e.g., the customer) immediately after the voice section sequence (e.g., the voice section of the operator), which has been identified by a keyword search, as the playback start position.

CONCLUSION (1) According to the embodiment of the present invention, a call search device obtains, for each of a reception channel and a transmission channel, a voice section sequence, which contains a search keyword, and the appearance time thereof as the keyword search results from a call search database that stores voice section sequences in association with predetermined keywords and time information. In addition, the call search device, based on the appearance time in the keyword search results, obtains the start time of a voice section sequence of another channel immediately before the voice section sequence, which has been obtained as a result of conducting a keyword search, and determines the start time as the playback start position for playing back the recorded voice, and thus outputs the playback start position as the voice search results. As described above, by determining the playback start position from the keyword search results, returning back to the position of a problem, it becomes possible for a user to efficiently check the content of a problematic speech. It is also possible to, other than selecting the start position of a voice section sequence of another channel immediately before a voice section sequence, which has been obtained as a result of conducting a keyword search, as the playback start position, select the start position of the voice section sequence, which has been obtained as a result of conducting a keyword search, as the playback start position, or determine the start position of a voice section sequence of another channel immediately after a voice section sequence, which has been obtained as a result of conducting a keyword search, as the playback start position.

Further, according to the present embodiment, the call search database may be configured to store a non-verbal information score (i.e., an emotion score that corresponds to the seriousness of a problem) of each voice section sequence, so that the priority of each voice search result for which the playback start position has been determined may be determined based on the non-verbal information score (i.e., an emotion score). The search result display screen (i.e., GUI) displays a plurality of voice search results in descending order of the priority. As described above, as the keyword search results are sorted in accordance with the seriousness of the problem, it is possible to efficiently find a problematic speech.

(2) The present invention can also be realized by a program code of software that implements the functions of the embodiments. In such a case, a storage medium having recorded thereon the program code is provided to a system or an apparatus, and a computer (or a CPU or a MPU) in the system or the apparatus reads the program code stored in the storage medium. In this case, the program code itself read from the storage medium implements the functions of the aforementioned embodiments, and the program code itself and the storage medium having recorded thereon the program code constitute the present invention. As the storage medium for supplying such a program code, for example, a flexible disk, CD-ROM, DVD-ROM, a hard disk, an optical disc, a magneto-optical disc, CD-R, a magnetic tape, a nonvolatile memory card, ROM, or the like is used.

Further, based on an instruction of the program code, an OS (operating system) running on the computer or the like may perform some or all of actual processes, and the functions of the aforementioned embodiments may be implemented by those processes. Furthermore, after the program code read from the storage medium is written to the memory in the computer, the CPU or the like of the computer may, based on the instruction of the program code, perform some or all of the actual processes, and the functions of the aforementioned embodiments may be implemented by those processes.

Moreover, the program code of the software that implements the functions of the embodiments may be distributed via a network, and thereby stored in storage means such as the hard disk or the memory in the system or the apparatus, or the storage medium such as CD-RW or CD-R, and at the point of use, the computer (or the CPU or the MPU) in the system or the apparatus may read the program code stored in the storage means or the storage medium and execute the program code.

Finally, it should be understood that the processes and technology described herein can be essentially implemented by not a specific device but any suitable combination of components. Further, a variety of types of general-purpose devices can be used in accordance with the teaching described herein. In order to execute the steps of the method described herein, constructing a dedicated device may be found to be advantageous. Further, a variety of inventions can be formed by appropriately combining a plurality of components disclosed in the embodiments. For example, some components may be removed from the whole components shown in the embodiments. Further, components in different embodiments may be combined as appropriate. Although the present invention has been described with reference to specific examples, they are not for limiting purposes but for illustrative purposes. One of ordinary skill in the art would appreciate that there is a number of combinations of hardware, software, and firmware that are suitable for implementing the present invention. For example, software description can be implemented by a wide range of programs or scripting languages, such as an assembler, C/C++, perl, Shell, PHP, and Java (registered trademark).

Further, in the aforementioned embodiments, the control lines and information lines represent those that are considered to be necessary for the description, and do not necessarily represent all control lines and information lines that are necessary for a product. All structures may be considered to be mutually connected.

The present invention is not limited to the aforementioned embodiments, and includes a variety of variations. In the present example, a problematic speech search system that operates in cooperation with a call recording device in a call center is supposed. However, the present invention can also be applied to a variety of systems, such as a system for searching for minutes used in a multi-spot video conference, and a system for searching for programs from a recorded program.

REFERENCE SIGNS LIST

1 Voice search system
2 Call recording device
3 Call search device
4 Call search terminal device
205-1 to 205-3 CPU
206-1 to 206-3 Memory
207-1 to 207-3 HDD
208-1 to 208-3 Communication unit
209 Keyboard
210 Display
211 Mouse
212 Speaker

The invention claimed is:
1. A voice search system comprising:
a recording device including:
a receiver configured to receive voice data; and
a memory configured to store the voice data;
a search device including:
a search database that stores, for each of a reception channel and a transmission channel of each of a plurality of pieces of recorded voice data, voice section sequences in association with predetermined keywords and time information; and
a processor configured to search the search database based on a search keyword, and obtain a voice section sequence that contains the search keyword,
wherein the processor is configured to:
obtain, as a keyword search result, a voice section sequence that contains the search keyword and an appearance time of the voice section sequence from the plurality of pieces of recorded voice data,
obtain, based on the appearance time in the keyword search result, a start time of a voice section sequence of another channel immediately before the voice section sequence obtained as the keyword search result, and determine the start time as a playback start position for playing back the recorded voice, and
output the playback start position as a voice search result on a graphical user interface;
wherein the search database further stores a non-verbal information score, indicating a seriousness of a problem discussed in the voice data, of each voice section sequence, and
wherein the processor is configured to determine, based on the seriousness of the problem indicated by the non-verbal information score, a priority of the voice search result for which the playback start position has been determined, and rearrange the voice search result based on the seriousness of the problem obtained from the non-verbal information score; and
a search terminal device including the graphical user interface that includes a display screen and a user input device through which a user inputs the search keyword.

2. The voice search system according to claim 1, wherein the processor is configured to output voice search results to the graphical user interface in descending order of the priority for display on the display screen.

3. The voice search system according to claim 2, wherein the processor is configured to allow, other than the start time of the voice section sequence of the other channel immediately before the voice section sequence obtained as the keyword search result, the start time of the voice section sequence obtained as the keyword search result or a start time of a voice section sequence of another channel immediately after the voice section sequence obtained as the keyword search result, to be selected as a playback start position for playing back the recorded voice, and display the playback start position on the display screen.

4. The voice search system according to claim 1, wherein the non-verbal information score is an emotion score that is obtained by determining an emotion in the voice section sequence, and
the emotion score is associated with a start time of the voice section sequence.

5. A voice search method for searching a search database based on a search keyword input by a user through a graphical user interface including a display screen and a user input device, and obtaining a voice section sequence that contains the search keyword, the search database being configured to store, for each of a reception channel and a transmission channel of each of a plurality of pieces of voice data, voice section sequences in association with predetermined keywords and time information, the method comprising causing a processor to:

receive and record the voice data;

receive the search keyword input by the user through the graphical user interface;

search the search database based on the search keyword;

obtain, as a keyword search result, a voice section sequence that contains the search keyword and an appearance time of the voice section sequence from the plurality of pieces of recorded voice data;

obtain, based on the appearance time in the keyword search result, a start time of a voice section sequence of another channel immediately before the voice section sequence obtained as the keyword search result, and determine the start time as a playback start position for playing back the recorded voice; and output the playback start position as a voice search result on the graphical user interface;

wherein the search database further stores a non-verbal information score, indicating a seriousness of a problem discussed in the voice data, of each voice section sequence, and wherein the method further comprises causing the processor to determine, based on the seriousness of the problem indicated by the non-verbal information score, a priority of the voice search result for which the playback start position has been determined, and rearrange the voice search result based on the seriousness of the problem obtained from the non-verbal information score.

6. The voice search method according to claim 5, further comprising causing the processor to output voice search results to the graphical user interface in descending order of the priority for display on the display screen.

7. The voice search method according to claim 6, further comprising, in the step of displaying the voice search results, causing the processor to allow, other than the start time of the voice section sequence of the other channel immediately before the voice section sequence obtained as the keyword search result, the start time of the voice section sequence obtained as the keyword search result or a start time of a voice section sequence of another channel immediately after the voice section sequence obtained as the keyword search result, to be selected as a playback start position for playing back the recorded voice, and display the playback start position on the display screen.

8. The voice search method according to claim 5, wherein
the non-verbal information score is an emotion score that is obtained by determining an emotion in the voice section sequence, and
the emotion score is associated with a start time of the voice section sequence.

9. A non-transitory computer-readable storage medium that stores a program for causing a computer to execute the voice search method according to claim 5.

* * * * *